March 30, 1971 R. B. HENDERSON Re. 27,106
ATHLETIC GAME BALL
Original Filed Nov. 24, 1965
FIG. 1
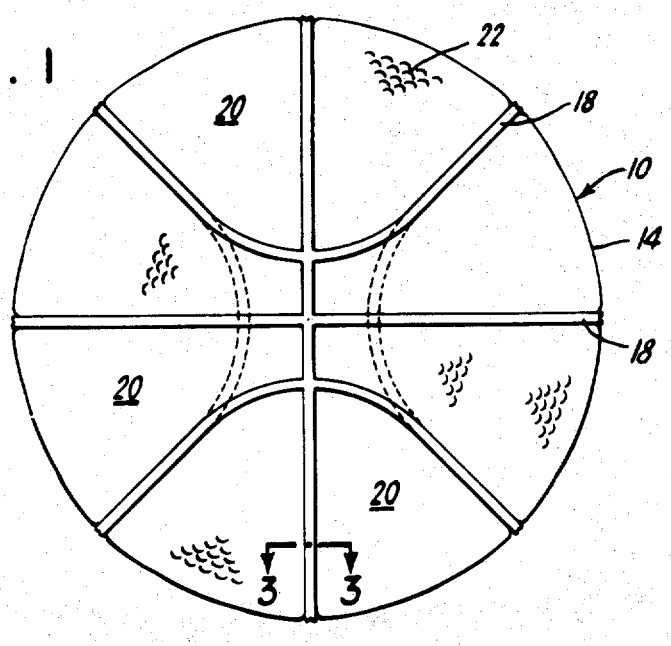
FIG. 2
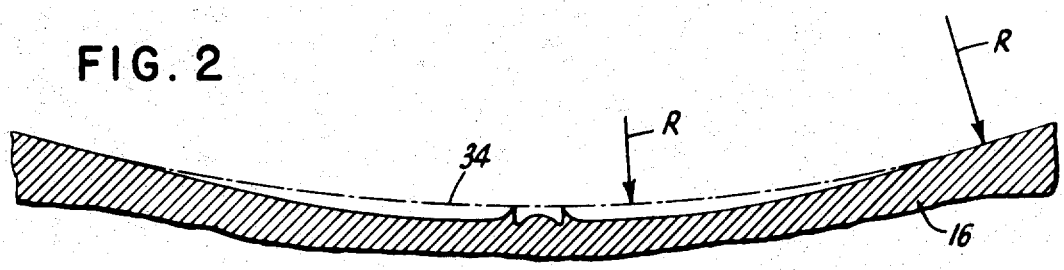
FIG. 3
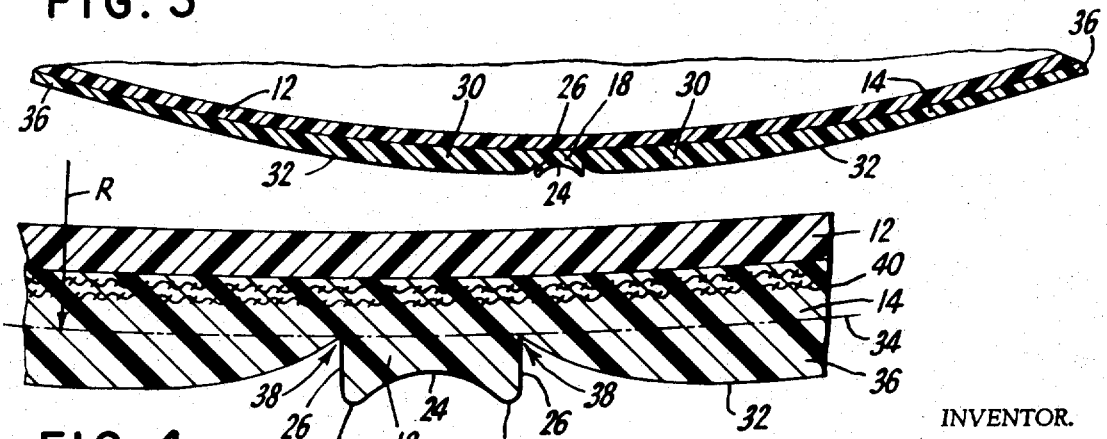
FIG. 4
INVENTOR.
ROBERT BRUCE HENDERSON
BY
ATTORNEY United States Patent Office Re. 27,106
Reissued Mar. 30, 1971

27,106
ATHLETIC GAME BALL

Robert Bruce Henderson, Newport Beach, Calif., assignor to AMF Incorporated, Jersey City, N.J.

Original No. 3,475,027, dated Oct. 28, 1969, Ser. No. 509,547, Nov. 24, 1965. Application for reissue Feb. 26, 1970, Ser. No. 14,387
Int. Cl. A63b *41/08*

U.S. Cl. 273—65 18 Claims

Matter enclosed in heavy brackets [ ] appears in the original patent but forms no part of this reissue specification; matter printed in italics indicates the additions made by reissue.

ABSTRACT OF THE DISCLOSURE

A game ball such as a basketball or football having a cover including simulated seams which divide the cover into separated cover panels. The seams are in the form of ribs which project upwardly from the cover and include concave top walls and straight side walls. The central surface areas of the panels form a symmetrical surface of revolution. The peripheral portions of the panels include first inwardly depressed parts adjacent their junctures with the seam simulating ribs and second more remote parts which are thicker than the central parts of the panels and extend outwardly beyond the symmetrical surface of revolution formed by the central surface areas of the panels.

The present invention relates to air inflated game balls, and has particular reference to such a ball having a molded elastomeric cover with simulated seams of an improved construction to enhance the holding and gripping qualities of the ball.

For many years inflated game balls, such as basketballs and footballs, of the approved or regulation type for use in tournaments and matches have been provided with leather covers. Because of the limited surface curvature which can be imparted to leather, such covers are generally formed of a plurality of panels shaped and sewn together to produce a seamed cover in the desired ball configuration. The seams joining the leather panels produce a pattern of inwardly projecting grooves along the surface of the ball which, in practice, have been found to be very desirable for assisting in gripping and handling the ball more securely when in play. It will be observed for example, that a basketball or football player will generally quickly rotate the ball in his hands prior to throwing the ball, the purpose of this maneuver being to position his fingertips in a particular location relative to the seams and enhance his feel or grip on the ball, and thereby his control and accuracy.

While leather covered game balls have good gripping and handling characteristics, and can withstand hard usage, they are relatively expensive to produce. To supply the need for less expensive balls, balls have heretofore been available having covers molded in one piece from elastomeric materials such as rubber and synthetic resins. In an effort to reproduce the appearance and handling characteristics of leather covered balls, it has been customary to provide molded cover balls with imitation seams by forming slight grooves or depressions in the desired pattern on the surface of the cover as it is molded. The grooves thus formed are subsequently generally colored black using a natural or synthetic rubber based paint, to simulate the seams and delineate the various panels.

However, such balls having the depressed simulated seams have inferior feel or grip characteristics as compared to leather covered balls. Moreover, the depressions or grooves heretofore proposed for simulating seams in a molded cover produce lines of weakness in the cover because of the thinning of the cover at these points. As a result, such balls tend to flex more readily along the seam than elsewhere, and the preferential flexing of the cover of the ball along the seam lines oftentimes causes a premature failure of the ball along a seam line.

Accordingly, an object of the present invention is to provide an air inflated athletic game ball having a molded elastomeric cover which overcomes the aforementioned deficiencies and problems.

Another object is to provide such a ball with simulated seams integrally formed on the cover surface having improved feel and gripping characteristics making possible optimum control and accuracy in handling and throwing the ball.

Another object is to provide such a ball having handling and gripping characteristics which compare favorably with those of regulation type leather covered balls.

Another object is to provide such a ball having simulated seams which can be quickly and readily located by the hands of the player using only the sense of touch.

Another object is to provide such a ball wherein the strength and resistance to flexure of the simulated seam portions of the cover are as great as the remaining portions of the cover.

A further object is to provide such a ball having enhanced gripping and handling qualities without detracting from the strength of the molded cover.

Yet a further object is to provide such a ball having a molded cover which can be easily and inexpensively made at high rates of production.

The above objects are accomplished in the present invention by molding a cover of elastomeric material on a preformed inflated ball bladder or carcass, which may if desired have a fiber reinforcing winding deposited thereon prior to the molding operation. During the molding operation, simulated seams are formed in a desired pattern along the surface of the ball, the seams consist of upstanding narrow ribs having edges raised above the normal surface curvature of the cover and defining a plurality of panels on the cover surface bounded by the ribs. The panel margins adjacent the ribs are also raised slightly above the normal surface curvature of the ball, and cooperatively form with the ribs a groove adjacent each side of the rib with the thickness of the molded cover at the lowermost part of the groove being at least equal to the substantially uniform thickness of the intermediate portions of the panels. The raised ribs and raised adjacent panel margins, together with the grooves formed thereby enable a player to readily locate the seam by feel and facilitate the gripping and handling of the ball is a secure manner, with the result that the ball can be handled and thrown with optimum control and accuracy.

Numerous other objects and advantages of the invention will be apparent as it is better understood from the following description, which, taken in connection with the accompanying drawings, discloses a preferred embodiment thereof.

Referring to the drawings:

FIGURE 1 is an elevational view of a game ball having a molded cover with the improved integrally formed simulated seam construction of the present invention;

FIGURE 2 is a fragmentary sectional view of a portion of a mold for making the cover showing the manner in which the mold is shaped to form the raised simulated seams;

FIGURE 3 is an enlarged sectional view taken substantially along the line 3—3 of FIGURE 1; and FIGURE 4 is an enlarged fragmentary sectional view similar to FIGURE 3 showing a modified cover having fiber reinforcing material embedded therein.

While it is to be understood that the present invention may be advantageously employed in various types of game balls, it is herein ilustrated and described as applied to a generally spherically shaped ball such as a basketball. In the preferred or exemplary embodiment of the instant invention shown in FIGS. 1 and 3, a basketball generally designated by the numeral 10 has an inner bladder 12 and an outer over 14. The bladder 12 may be formed of a single or a plurality of layers of any materials commonly known and used in the art. In the embodiment shown, the bladder 12 consists of a single layer of elastomeric material, preferably butyl rubber for good retention of air under pressure, formed and cured in the conventional manner.

The bladder 12 when inflated has a substantially smooth surface generally conforming to the desired ball shape. In making the ball 10, a quantity of cover material is deposited on the surface of the inflated bladder 12 using any commonly known method, such as by dipping the bladder in a vat of the material in fluid form maintained at a predetermined viscosity so as to deposit a desired quantity of the material on the bladder surface, flood coating the fluidized material on the bladder as it is conveyed through a coating station, or by spraying the fluidized material upon the bladder surface to build up the desired thickness of the material. Alternatively, the cover material may be preformed in sections, such as thin hemispherical sections, and the bladder enclosed by the preformed sections using a suitable bonding agent between the preformed sections and the bladder if necessary. The covered bladder is then placed in a mold 16 and the material compression molded and cured to form the cover 14 with the desired shape and surface configuration and simultaneously intimately bond the cover to the bladder.

The mold 16 is provided with appropriate recesses and projections so as to produce upstanding narrow ribs 18 on the cover 14 and form simulated seams on the surface of the ball 10 which define eight panels 20 in the pattern and shape which is characteristic of leather covered basketballs having sewn seams. The panels 20 may also be provided with embossings 22 forming a pebbled surface in imitation of the grained surface of leather basketballs.

In the preferred embodiment shown, the ribs or simulated seams 18 have a centrally depressed top surface 24 and substantially straight side walls 26 which are joined together by rounded edge surfaces 28. On each side of the ribs 18 marginal portions 30 of the panels 20 are thickened by smoothly projecting the surfaces 32 of the marginal portions beyond a spherical envelope 34 of radius R, indicated by the dashed line in FIG. 2, defining the surface profile of the unthickened areas 36 of the panels. The surfaces 32 of the thickened panel margins 30 curve inwardly adjacent the ribs 18 to join the side walls 26 and form grooves 38 adjacent each side of the ribs. Preferably, the bottoms of the grooves 38 lie on the spherical envelope 34 so that the thickness of the cover 14 at the grooves is substantially the same as the thickness of the unthickened intermediate panel areas 36.

It is apparent that with the cover construction described, the edge surfaces 28 and panel margins 30 are raised above the normal spherical envelope 34 of the ball. With such a simulated seam profile, a player can readily locate the raised surfaces with his fingertips without having to direct his vision to the ball, and can quickly obtain a secure grip on the ball by means of the projecting edges 28 and thereby exercise greater control and accuracy in handling and throwing the ball as compared to molded cover balls theretofore available.

I have found that with a basketball having a nominal diameter of 9¼ inches, in which case the radius R of the spherical envelope 34 is approximately 4⅝ inches, the simulated seams of the present invention may be suitably formed by positioning the edge surfaces 28 approximately .045″ above the spherical envelope 34, and also making the thickened marginal panel portions 30 approximately 1″ in width and projecting the outermost point of the surfaces 32 approximately .035″ above the spherical envelope. These dimensions provide simulated seams having improved feel and gripping characteristics without detracting from any of the other playing features of the ball. It should be understood, of course, that the figures gives above are simply by way of example, and may be varied according to the individual choice and judgement.

FIGURE 4 shows a portion of the wall section of a ball having a simulated seam construction of the present invention which is similar to the ball previously described but additionally includes a reinforcing layer 40 surrounding the bladder 12 and embedded within the molded cover 14. The reinforcing layer 40 may consist of any of the materials commonly known and used in the art such as natural or synthetic fibers, and may be applied in any conventional manner such as by winding filamentous material about the bladder or affixing woven fabric sections to the bladder surface. The reinforcing layer 40 provides a strong flexible layer on the ball for better resisting the internal air pressure and thereby providing better control over the ball size as well as increased resistance to abuse.

Preferably, the reinforcing layer 40 is a thin nylon thread repeatedly wound about the bladder 12 to uniformly distribute the winding on the bladder surface. Prior to the winding operation, the bladder 12 is inflated to a predetermined pressure so that it assumes a desired size. The cover material is then deposited upon the bladder 12 and molded to form the outer cover 14. During the molding operation, the cover material penetrates the interstices of the reinforcing layer 40 and is bonded to the surface of the bladder 12. With a nylon reinforcing layer 40, the cover material is preferably a polyvinyl chloride, plastisol which suitably impregnates the winding. Also, it is preferable to make the bladder 12 of a blended composition which includes nitrile rubber and polyvinyl chloride so that a strong fused bond is formed between the bladder and the cover 14 when the cover is compression molded.

It will be seen that molded cover balls having the simulated seam construction described have enhanced grip and handling characteristics which compare favorably with those of leather covered balls, and which are far better as compared to molded cover balls having simulated seams heretofore available. They also are better able to withstand use and abuse without premature failure as compared to molded cover balls heretofore available because of the absence of lines of weakness formed by thinned cover sections at the locations of the simulated seams. The improved structural strength is achieved without detracting from the flexibility, bounce, and other characteristics which an athletic game ball must have, and without increasing the cost of manufacture as compared to conventional molded cover balls. While the ball of the present invention compares favorably with leather covered balls with respect to their relative structural and dynamic characteristics, the cost of producing the molded cover balls of the present invention is substantially less because of the more complex manufacturing procedure required for leather covered balls including the steps of cutting and shaping the leather panels, sewing the seams, etc.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An athletic game ball comprising a hollow bladder formed of an elastomeric material, a pressurized gas disposed interiorly of said bladder, and a cover formed of an elastomeric material disposed exteriorly of and bonded to said bladder, said cover having a plurality of simulated seams formed on the outer surface thereof and dividing said surface into panels separated by said seams, each of said simulated seams comprising a rib extending outwardly beyond the outer surfaces of the panel marginal portions immediately adjacent thereto and having a top wall with side walls depending therefrom, each of said panels having marginal portions and an outer surface disposed intermediate said marginal portions, each of said marginal portions being disposed adjacent a rib side wall, each of said marginal portions comprising a curved outer panel surface extending outwardly from the innermost end of an adjacent rib side wall and then inwardly to and merging smoothly with the intermediate outer panel surface between marginal portions of a panel, the outer surfaces of said panels intermediate the marginal portions thereof defining a substantially symmetrical surface of revolution, the outermost portions of said outwardly curved outer surfaces of the marginal portions of said panels and the top walls of said ribs being disposed significantly outwardly from said surface of revolution so that said simulated seams and the adjacent panel marginal portions form readily locatable gripping surfaces for manually grasping and throwing said ball.

2. The game ball as set forth in claim 1 additionally including fiber reinforcing material disposed about said bladder and embedded in said cover.

3. The game ball as set forth in claim 1 wherein the lines of juncture of said outwardly curved surfaces of said panel marginal portions and said side walls of said ribs lie substantially on said surface of revolution.

4. The game ball as set forth in claim 1 wherein the thickness of said cover at the juncture of said side walls and said outwardly curved surfaces is substantially equal to the thickness of said panels intermediate said marginal portions.

5. The game ball as set forth in claim 1 wherein the distance from said surface of revolution to the outermost portion of said rib top walls is greater than the corresponding distance to the outermost portion of said outwardly curved surfaces.

6. The game ball as set forth in claim 1 wherein the central portion of said rib top wall is inwardly depressed.

7. The game ball as set forth in claim 6 wherein said top wall is a transversely concave surface cooperatively forming with said side walls arcuately rounded outwardly extending edges.

8. The game ball as set forth in claim 1 wherein said surface of revolution is substantially a sphere.

9. The game ball as set forth in claim 1 wherein said surface of revolution is a substantially ellipsoidal configuration.

*10. An inflatable game ball comprising a cover having simulated seams formed on the outer surface thereof and dividing said surface into panels separated by said seams, said panels and said seams comprising a unitary one piece molded in situ construction, each of said simulated seams comprising a rib extending outwardly beyond the outer surfaces of the panel immediately adjacent thereto and having a top wall with side walls depending therefrom, each of said panels having marginal portions and an outer surface disposed intermediate said marginal portions, each of said marginal portions being disposed adjacent a rib side wall, each of said marginal portions comprising a curved outer panel surface extending outwardly from the innermost end of an adjacent rib side wall and then inwardly to and merging smoothly with the intermediate outer panel surface between marginal portions of a panel, the outer surfaces of said panels intermediate the marginal portions thereof defining a substantially symmetrical surface of revolution, the outermost portions of said outwardly curved outer surfaces of the marginal portions of said panels and the top walls of said ribs being disposed significantly outwardly from said surface of revolution so that said simulated seams and the adjacent panel marginal portions form readily locatably gripping surfaces for manually grasping and throwing said ball.*

*11. The game ball as set forth in claim 10 additionally including fiber reinforcing material embedded in said cover.*

*12. The game ball as set forth in claim 10 wherein the lines of juncture of said outwardly curved surfaces of said panel marginal portions and said side walls of said ribs lie substantially on said surface of revolution.*

*13. The game ball as set forth in claim 10 wherein the thickness of said cover at the juncture of said side walls and said outwardly curved surfaces is substantially equal to the thickness of said panels intermediate said marginal portions.*

*14. The game ball as set forth in claim 10 wherein the distance from said surface of revolution to the outermost portion of said rib top walls is greater than the corresponding distance to the outermost portion of said outwardly curved surfaces.*

*15. The game ball as set forth in claim 10 wherein the central portion of said rib top wall is inwardly depressed.*

*16. The game ball as set forth in claim 15 wherein said top wall is a transversely concave surface cooperatively forming with said side walls arcuately rounded outwardly extending edges.*

*17. The game ball as set forth in claim 10 wherein said surface of revolution is substantially a sphere.*

*18. The game ball as set forth in claim 10 wherein said surface of revolution is a substantially ellipsoidal configuration.*

References Cited

The following references, cited by the Examiner, are of record in the patented file of this patent or the original patent.

UNITED STATES PATENTS 2,653,818 9/1953 Tebbetts, Jr., et al. 273—65(E)(G)

FOREIGN PATENTS 575,182 5/1959 Canada ------ 273—65(E)(G)

GEORGE J. MARLO, Primary Examiner